(12) United States Patent
McKinnon

(10) Patent No.: US 8,303,450 B2
(45) Date of Patent: Nov. 6, 2012

(54) ECCENTRIC DUAL STEPPING GEAR ROLLER BEARING SYSTEM

(76) Inventor: Paul G. McKinnon, Brigham City, UT (US)

( * ) Notice: Subject to any disclaimer, the term of this patent is extended or adjusted under 35 U.S.C. 154(b) by 219 days.

(21) Appl. No.: 12/804,286

(22) Filed: Jul. 19, 2010

(65) Prior Publication Data

US 2012/0015774 A1   Jan. 19, 2012

(51) Int. Cl.
*F16H 1/32* (2006.01)
(52) U.S. Cl. .................................................. 475/168
(58) Field of Classification Search ............ None
See application file for complete search history.

(56) References Cited

U.S. PATENT DOCUMENTS

| | | | | |
|---|---|---|---|---|
| 3,439,562 | A | * | 4/1969 | Bickley ..................... 475/168 |
| 5,286,236 | A | * | 2/1994 | Hosokawa et al. ......... 475/168 |
| 7,621,838 | B2 | * | 11/2009 | Ogawa ..................... 475/168 |
| 8,162,790 | B2 | * | 4/2012 | Imase et al. .............. 475/168 |

* cited by examiner

*Primary Examiner* — Dirk Wright
(74) *Attorney, Agent, or Firm* — Marcus G. Theodore

(57) ABSTRACT

An eccentric dual stepping gear roller bearing system, which consists of an input shaft and an output shaft associated with a gear ring holding an exterior row of equally spaced ball bearings, an output gear with an interior row of lesser diameter with fewer equally spaced ball bearings held at a different plane relative the exterior row, and at least one stepping gear with exterior and interior stepping gears having differing radii joined off-set on top of one another and eccentrically mounted on the drive shaft to act on the interior and exterior rows of roller bearings, which act as gear teeth to rotate the output gear to reduce shaft output.

9 Claims, 4 Drawing Sheets

ECCENTRIC DUAL STEPPING GEAR ROLLER BEARING SYSTEM

BACKGROUND OF THE INVENTION

1. Field of Invention

The present invention relates to gearing systems. In particular, it relates to an eccentric dual stepping gear roller bearing system with at least combination exterior and interior stepping gears of differing diameters and gear teeth joined off-set on top of one another and structured to act on two different diameter circular rows of roller bearings at different planer elevations, which provides different gearing ratios by changing the size and number of the roller bearings in the two concentric rows and the diameter of the concentric rows.

2. Description of Related Art

A number of eccentric toothed gearing systems are known, such as Moskob, U.S. Pat. No. 6,491,601 issued Dec. 10, 2002 using a guide pinion cooperating with the eccentric wheel to assure eccentric motion of the eccentric wheel and prevent an undesired rotation of the eccentric wheel.

Moscob, U.S. Pat. No. 6,453,772 issued Sep. 24, 2002 is another eccentric toothed gearing system for electrical drive motors using part of the housing as guide elements for the eccentric wheel.

Monti, U.S. Pat. No. 3,635,103 issued Jan. 18, 1972 discloses a planetary reduction gearing system mounted on a planet wheel on a planet carrier, wherein the axis of rotation of said wheel is concentric with the pitch circle thereof and the planet wheel is supported about an axis eccentric thereto. As the eccentric rotates, it locks a sleeve about balls fitted over the spindles so that the planet wheels and their respective axes are caused to describe an orbit about the central axis of the shaft to move in the conventional manner.

Cotreau, U.S. Pat. No. 4,193,325 issued Mar. 18, 1980 discloses a speed reducing gear box including for each reducing stage, a plurality of planetary gears revolving about a central sun gear and inside an internal gear, the improvement of axially loading the planetary gears to provide sufficient friction to retard balloting of said gears, but not to substantially reduce power transmission of said gear box and to allow use of a tighter planetary gear mesh to decrease angular transmission.

Pitchford et al., U.S. Pat. No. 4,379,976 issued Apr. 12, 1983 discloses a Plano centric gear drive with an eccentrically floating driving gear for simultaneously engaging a stator gear and a rotatable output gear to rotate the output gear through relatively small angular increments. The stator and output gears have different numbers of teeth and are mounted coaxially for engaging the driving gear on a common axial line of contact wherein the stator and output gear teeth are in local axial alignment at the time of contact. The driving gear is attracted into meshing engagement with the stator and output gears by a circumferentially arranged plurality of electromagnets energizable in sequence to rotate the driving gear eccentrically in steps about the stator and output gears. During eccentric rotation, the common axial line of contact revolves in steps about the stator and output gears, with the output gear rotating through small angular increments to permit the stator and output gear teeth to remaining axial alignment at the revolving line of contact. When inactivated, the driving gear engaging the stator and output gears locks the output gear against rotation with respect to the stator gear.

Foskett, U.S. Pat. No. 3,492,515 issued Jan. 27, 1970 discloses a bi-directional electromagnetically controlled stepping motor with nutating gear. It consist of two face gears, each having a different number of teeth, with one gear fixed and the other coupled to a drive shaft. The shaft-coupled gear is selectively displaced, by electromagnetic means, so that its teeth locally engage and mesh with teeth of the fixed gear. The point of local contact is advanced by the shaft coupled gear wobbling around the fixed gear, causing the drive shaft to rotate with an intermittent or stepped motion.

Distin et al., U.S. Pat. No. 4,643,047 issued Feb. 17, 1987 discloses an epicyclic speed reducing mechanism employing torque transmitting elements a series of rolling elements which are constrained to travel along a substantially trochoidal path defined by means of complementary or conjugate surface regions formed on the driving and driven members. The epicyclical path of the roller balls shown in FIG. 7 is then converted into rotary motion or reduced output.

Schmidt et al., U.S. Publication No. US2007/0087887 published Apr. 19, 2007 discloses a gear mechanisms for adjusting movable parts in a motor vehicle comprising a spur wheel, which is provided with external teeth and meshes with an internal gear that is provided with internal teeth, wherein the number of internal teeth to generate a certain gear step-up ratio is greater by at least one than the number of external teeth, and the spur wheel and the internal gear perform an eccentric movement relative to one another. The eccentric movement is directed exclusively by means of the matching tooth geometry of the internal and external teeth. Note FIG. 5 shows a plurality of cylindrical rollers as internal teeth, are embodied either as freely rotating sleeves or formations fixed to the internal gear.

Cited for general interest are Heer, U.S. Pat. No. 6,302,073 issued Oct. 16, 2001, which is a device adjusting the phase angle of a camshaft of an internal combustion engine with a drive gear for driving a camshaft accommodated in a coaxial arrangement relative to the camshaft and an electric motor via a harmonic drive. The harmonic drive has a roller bearing with an elliptical inner ring, an externally toothed flexible gear arranged on said roller bearing and a rigid, internally toothed gear engaging the externally toothed gear. This structure provides the desired gear reduction when meshed with a flexible gear arranged on a roller bearing meshing with a rigid internally toothed gear engaging the externally toothed gear.

Moteki et al., U.S. Publication No US2006/0250048 published Nov. 9, 2006 discloses a rotary drive device. McEwen, U.S. Pat. No. 5,985,145 issued Nov. 16, 1999 discloses a shaft mounted gear box with an eccentric gear whose teeth acting on a single row of eccentric rollers.

None provide an Eccentric Dual Stepping Gear Roller Bearing System, which consists of two dual exterior and interior stepping gears joined and structured to act on two concentric circular rows of roller bearings, which act as gear teeth. The device shown below provides such an invention.

SUMMARY OF THE INVENTION

The present invention comprises an eccentric dual stepping gear roller bearing system comprising an eccentric input drive, such as a pulley drive, affixed to a drive shaft, and an output drive shaft. Positioned between the eccentric input drive and the output drive is the eccentric dual stepping gear roller bearing system. It has an output gear mounted within a gear ring with a circumferential housing defining a cylindrical interior with a portal leading into said cylindrical interior and sized to accommodate the output shaft and output gear. The gear ring includes structure to hold a circular peripheral exterior row of a plurality of roller bearings in fixed equidistant positions around the interior perimeter in a manner which exposes the surfaces of the roller bearings.

The output gear is attached to the output shaft and positioned to fit and rotate within the gear ring interior. The output gear has peripheral teeth-like structure adapted to hold a circular interior row of a plurality of roller bearings in fixed equidistance circular positions around the output shaft in a different planer alignment relative to that of the exterior row of roller bearings. In addition, the number of interior roller bearings in the interior row is less than the number of roller bearings in the exterior row.

At least one eccentric stepping gear with two exterior and interior stepping gears having different radii are joined off-center on top of one another so that their respective teeth are somewhat concentrically aligned. The eccentric stepping gear is then eccentrically attached to the input drive shaft and positioned within the cylindrical interior of the gear ring so that the teeth of the exterior stepping gear contacts the roller bearings in the exterior row, and the teeth of the interior eccentric stepping gear contacts the roller bearings in the exterior row of the output gear. When activated by the eccentric drive shaft, the eccentric stepping gear moves such that the exterior eccentric stepping gear teeth push against the roller bearings in the exterior row in a stepping gear like motion causing the joined interior stepping gear teeth to push against and sequentially move the interior ball bearings to rotate the output gear, when activated by the drive shaft. The different numbers of balls, the differences in the radii and diameters of the exterior and interior rows of roller bearings, and the different sizes of balls reduce the rotation of the output gear and the output shaft.

Encasement structure, such as a circumferential housing with portals leading into an interior sized to accommodate the eccentric input drive shaft and output drive shaft is structured to rotationally secure within the cylindrical interior of the gear ring the stepping gear eccentrically affixed to the eccentric input drive shaft and the output gear affixed to the output shaft and positioned such that the gear teeth act upon the first and second rows of roller bearings to reduce the output as described above.

The encasement structure may be of single piece construction or have multiple parts, such as a series of plates with portals to accommodate the eccentric input drive shaft and the output drive shaft, and an interior to accommodate the output gear and stepping gear. Means such as bolts, screws, welds, fasteners, etc. secure the various parts of the encasement structure to secure operationally the eccentric combination stepping gears and output gears within the cylindrical interior to reduce the eccentric drive shaft interior into a gear reduced output for the output shaft.

The dual exterior and interior eccentric stepping gears have different numbers of gear teeth structured as cusps to sequentially contact and push against the roller bearings. The stepping-like motion of the interior and exterior eccentric stepping gear teeth sequentially contact approximately ⅓ of the exterior and interior rows of roller bearings at any given time.

The number of exterior roller bearings is greater than the number of interior roller bearings with the number selected to effectuate the desired gear reduction ratio. The roller bearings may be cylindrical or ball bearings, depending upon the application. Preferred roller bearings are ball bearings as they may rotate in different directions to minimize frictional losses, but cylindrical roller bearings provide added directional stability. These roller bearings are replaceable and provide an inexpensive gear construction.

In one embodiment, the number of exterior roller bearings is two more than the number of interior roller bearings. The size of the diameter of the interior row of roller bearings and the exterior row of roller bearings may differ and are selected to provide the desired gear reduction. In addition, the size of the gear diameters may be adjusted so that diameter of the interior row of roller bearings and the diameter of the exterior row of roller bearings are selected to provide the desired gear reduction in excess of 10:1. The device provides particularly good gear reduction of 10:1; 62:1, 70:1 on up to 500:1.

The throw mounts of the exterior and interior eccentric stepping gears are selected so that the stepping gear teeth contact approximately one-third of the roller bearings of each row at a given time.

The advantage of this eccentric dual stepping gear roller bearing system is that it provides an inexpensive gear construction requiring minimal amount of lubrication depending upon tolerances. Bearings may be easily replaced, depending upon wear, without the need of replacing the entire stepping gearing system. The shaft inputs and outputs to the eccentric dual stepping gear roller bearing system may also be reversed to produce increasing outputs, where torque resistance is light because of the large gear reduction ratios.

This eccentric dual stepping gear roller bearing system has been employed with various motor reduction drive systems. In one application, the shaft of a 1700 rpm mixer was affixed to the stepping gearing system to reduce the output to 10:1. In another application, the stepping gear roller bearing system was employed in a pulley with a 500:1 reduction. Thus the invention provides a reduction gearing system from 10:1 to 500:1 for use with a wide variety of applications.

DESCRIPTION OF THE ILLUSTRATED EMBODIMENTS

Figures 1, 2:
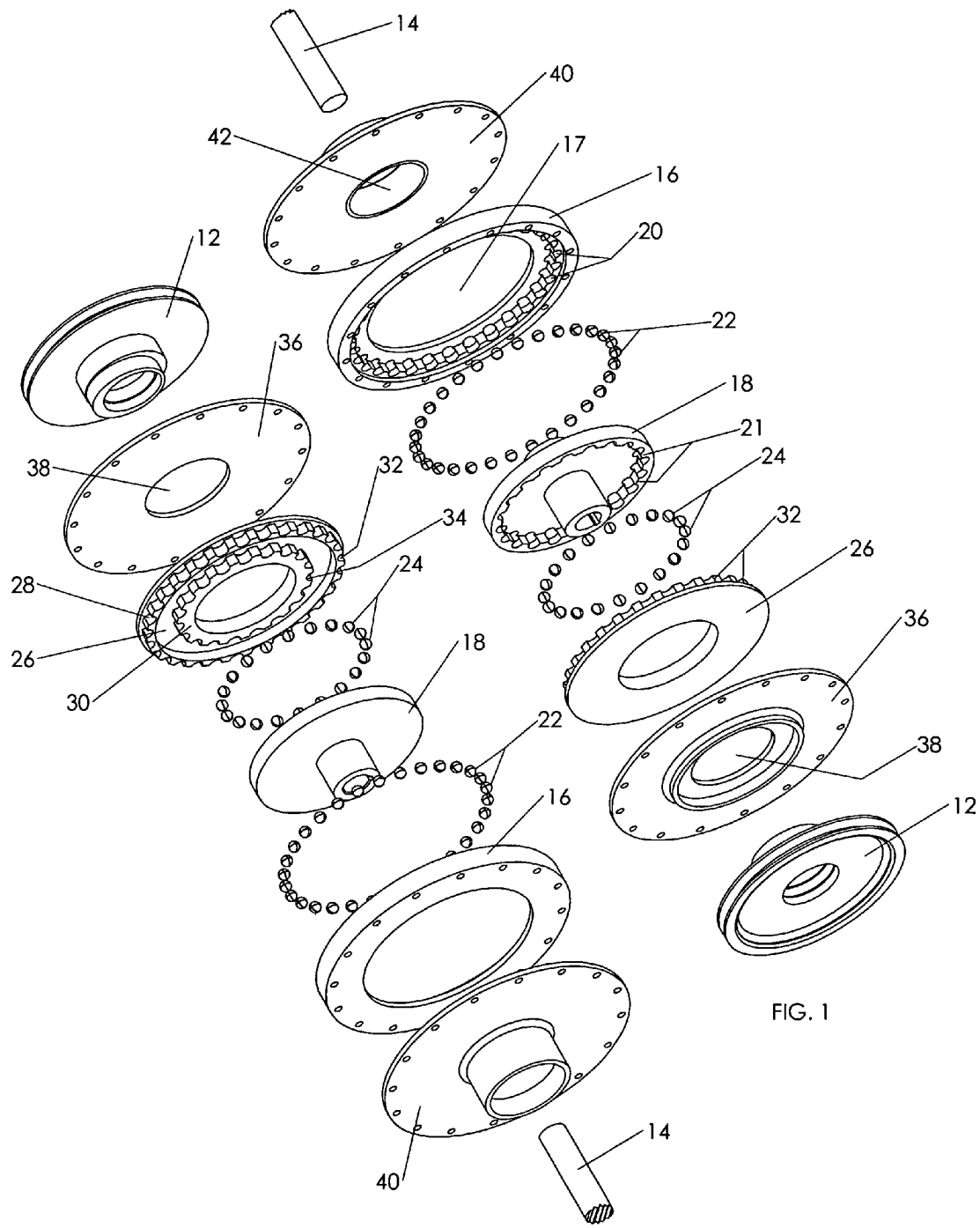
FIG. 1 is a top exploded perspective view of the stepping gear embodiment of the invention.
FIG. 2 is a bottom exploded perspective view of the embodiment of the stepping gear shown in FIG. 1.

FIG. 1 is a top exploded perspective view of the eccentric dual stepping gear roller bearing system invention 10. The eccentric dual stepping gear roller bearing system comprises: an eccentric input drive shaft 12 shown as a pulley drive, and an output drive shaft 14. A gear ring 16 defining a cylindrical interior with a portal 17 sized to accommodate the output shaft 14 affixed to an output gear 18. The gear ring 16 includes structure 20 to hold a circular exterior row of a plurality of roller bearings 22 in fixed positions around its cylindrical interior perimeter walls in a manner which exposes the surfaces of the roller bearings 22.

The output gear 18 is attached to the output shaft 14 positioned to fit and rotate within the gear ring 16 portal 17 so that the output gear 18 rotates within the gear ring 16 interior. The output gear 18 has peripheral teeth-like structure 21 adapted to hold a smaller circular interior row of a plurality of roller bearings 24 in fixed equidistance circular positions around the output shaft 14 in a different planer alignment relative to that of the exterior row of roller bearings 22. The number of interior roller bearings 24 is less than the number of exterior roller bearings 22 to effectuate gear reduction.

Figure 5:
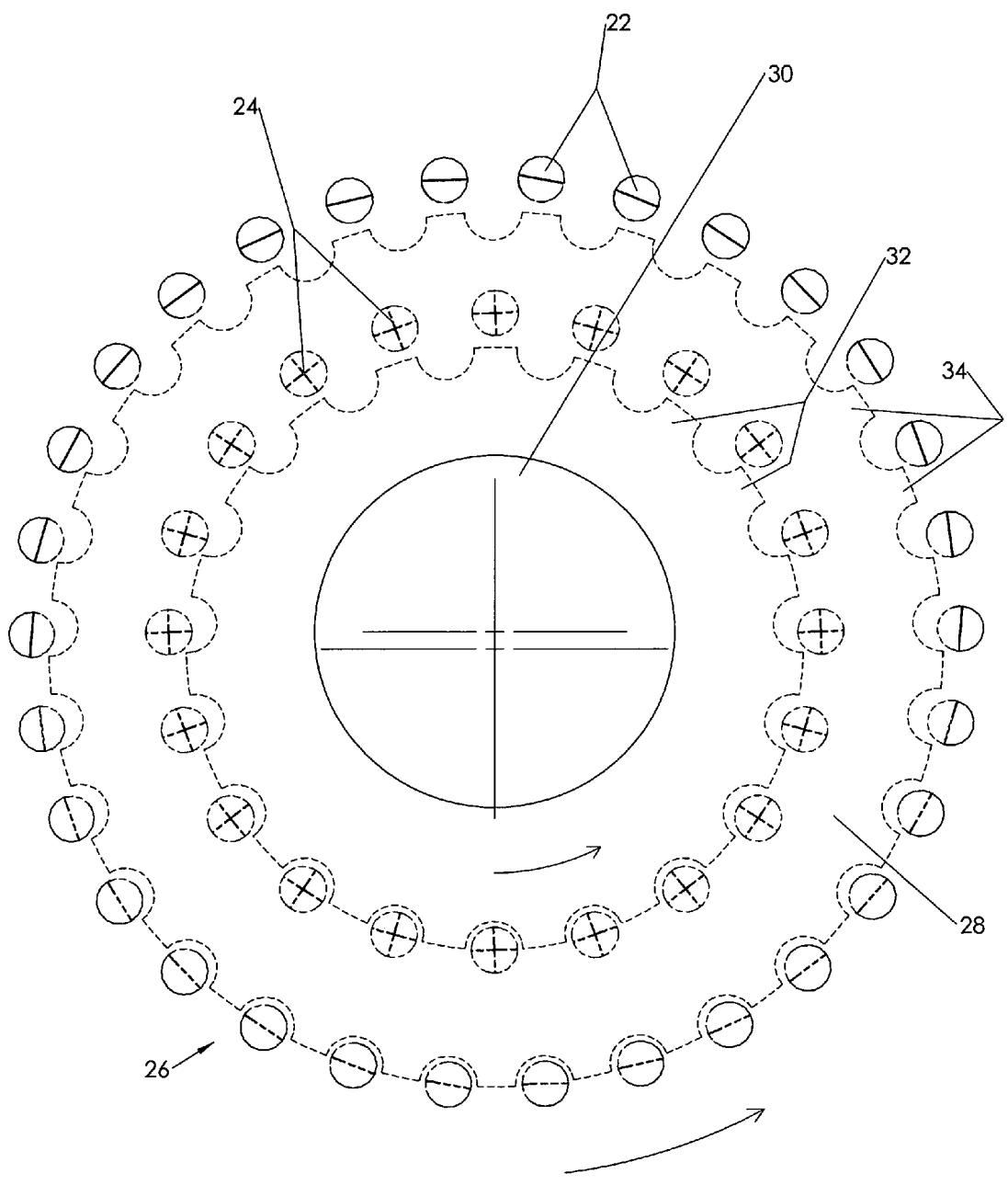
FIG. 5 is a top view of the main components of the dual stepping gear sequentially acting on inner and outer rows of roller bearings.

At least one stepping gear 26 with combination exterior and interior stepping gears 28, 30 having different radii are joined slightly off-center as shown in FIG. 5 on top of one another and eccentrically attached to the eccentric input drive shaft 12. The combination exterior and interior eccentric stepping gears 28, 30 have different radii and numbers of gear teeth 32, 34 structured as cusps so that the exterior gear teeth 34 contact and push against the fixed exterior rows of roller bearings 22 in a stepping motion. This causes the interior stepping gear 30 teeth 32 to push against and sequentially move the interior ball bearings 24 in a stepping gear like motion to rotate the output gear 18 to drive the output shaft 14 and provide a reduced output gear ratio.

Encasement structure shown as a circumferential front cover 36 with a portal 38 sized to accommodate the eccentric input drive shaft 12 is structured to cover the stepping gear 26 and secure within the gear ring 16 cylindrical interior the combination exterior and interior stepping gears 28, 30 eccentrically affixed to the eccentric input drive shaft 12. A corresponding circumferential rear cover 40 with a portal 42 sized to accommodate the output shaft is structured to cover the gear ring 16 and operably secure the various components relative to one another with bolts, screws, welds, etc. through holes as shown.

FIG. 2 is a bottom exploded perspective view of the embodiment of the stepping gear 10 shown in FIG. 1 showing the combination stepping gear 26 teeth 32, 34.

Figures 3, 4:
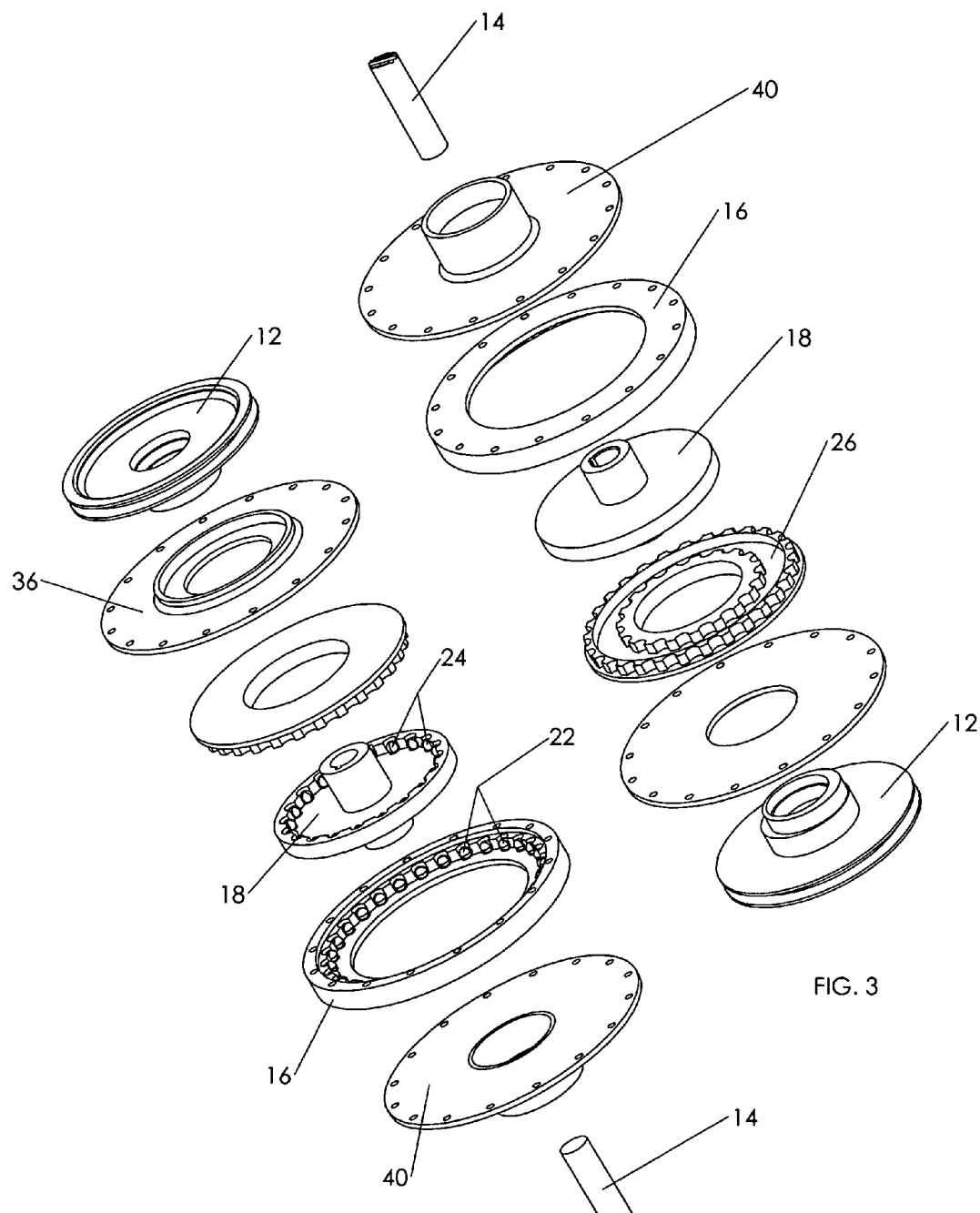
FIG. 3 is a top exploded perspective view of the stepping gear with the circular roller bearings shown in FIGS. 1 and 2 seated.
FIG. 4 is a bottom exploded perspective view of the stepping gear with the circular roller bearings shown in FIGS. 1 and 2 seated.

FIG. 3 is a top exploded perspective view of the stepping gear 10 with the circular roller bearings 22, 24 of FIGS. 1 and 2 seated on the gear ring 16 perimeter structure 20 and on the output gear 18 peripheral teeth-like structure 21.

FIG. 4 is a bottom exploded perspective view of the stepping gear 10 with the circular roller bearings shown in FIGS. 1 and 2 seated on the gear ring 16 perimeter walls structure 20 and on the output gear 18 peripheral teeth-like structure 21.

FIG. 5 is a top view of the combination stepping gear 26 exterior and interior gears 28, 30 with different radii joined on top of one another slightly off-center and eccentrically attached to the drive shaft 12 to act in a stepping-like motion for their teeth 32, 34 to sequentially contact approximately the exterior and interior roller bearings 22, 24. The throw of the exterior and interior eccentric stepping gears 30, 32 is selected so that the stepping gear teeth 32, 34 contact approximately one-third of the roller bearings 22, 24 at a given time.

The exterior and interior eccentric stepping gears 30, 32, when activated by the drive shaft 12, eccentrically move such that the exterior eccentric stepping gear 32 teeth 32 push against the fixed exterior roller bearings 22 in a stepping gear like motion causing the joined interior stepping gear 30 teeth 32 to push against and sequentially move the interior ball bearings 24 when activated by the drive shaft 12 to reduce the rotation of the output gear 18 and shaft 14.

The roller bearings 22, 24 may be cylindrical or ball bearings, depending upon the application. The number of exterior roller bearings 22 is two more than the number of interior roller bearings 24. The size of the diameter of the interior row of roller bearings 24 and the exterior row of roller bearings 22 differ and are selected to provide the desired gear reduction. In addition, the size of the gear diameters may be adjusted so that the diameter of the interior row of roller bearings 24 and the diameter of the exterior row of roller bearings 22 provide the desired gear reduction in excess of 10:1.

The drive inputs to the input drive shaft 12 and output drive shaft 14 may be reversed to provide an increased output ratio, where the torque resistance is light.

Figure 6:
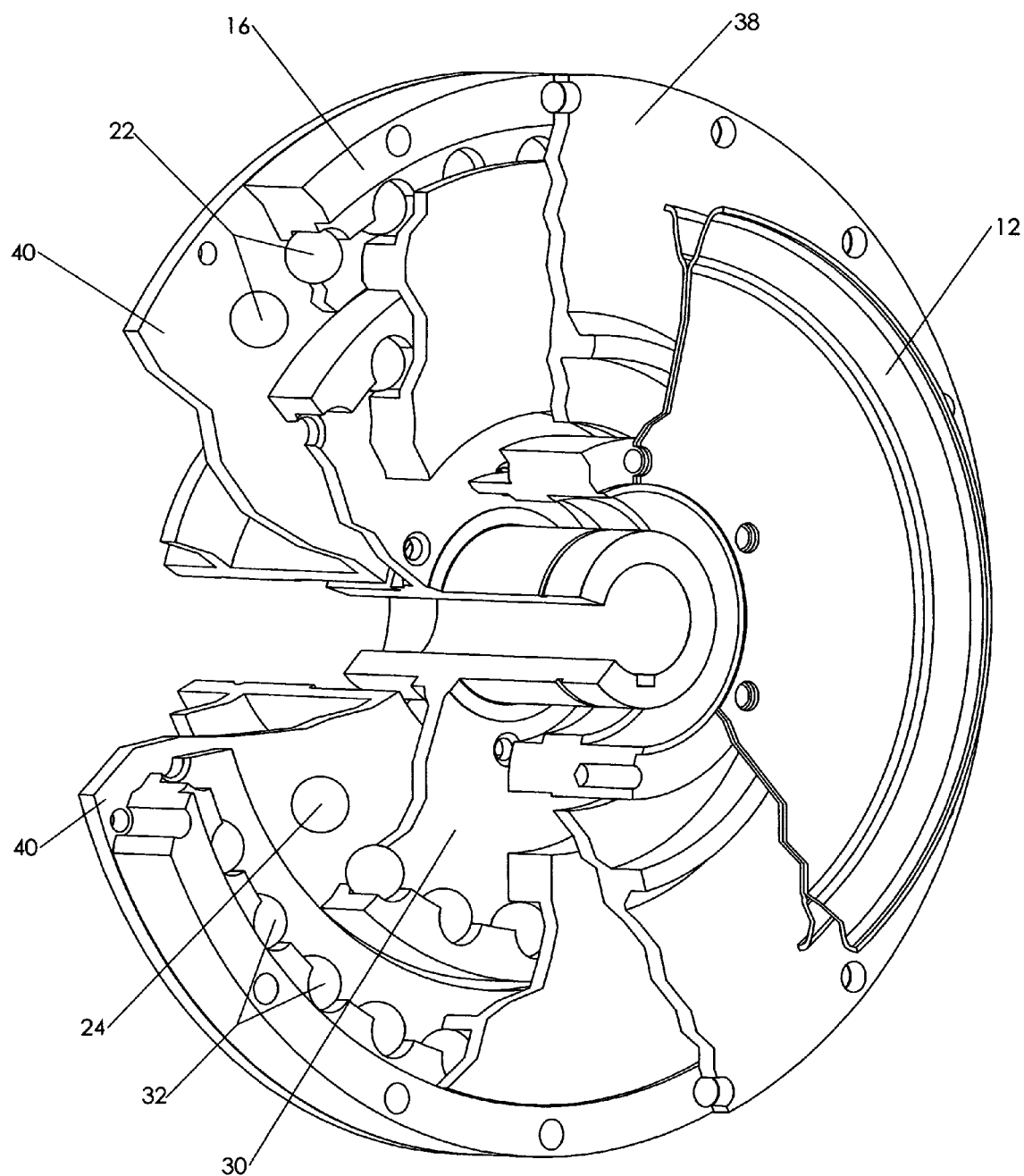
FIG. 6 is an assembled cut-away view of the stepping gear shown in FIG. 1

FIG. 6 is an assembled cut-away view of the stepping gear shown in FIG. 1.

The above description and specification should not be construed as limiting the scope of the claims but as merely providing illustrations of some of the presently preferred embodiments of this invention. Thus, the appended claims recite those features deemed essential to the invention.

I claim:

1. An eccentric dual stepping gear roller bearing system comprising:
   a. an eccentric input drive shaft,
   b. an output shaft,
   c. a gear ring with a portal sized to accommodate the output shaft and an affixed output gear defining a cylindrical interior to accommodate the output gear and a stepping gear, including peripheral structure to hold around the cylindrical interior a circular exterior row of a plurality of roller bearings in fixed equidistant positions with exposed roller surfaces surrounding the shaft portal,
   d. an output gear attached to the output shaft is positioned to fit and rotate within the gear ring interior with structure defining a cylindrical interior of lesser diameter than that of the exterior row of the gear ring adapted to hold a circular interior row of a plurality of roller bearings in fixed equidistance circular positions around the output gear interior at a different plane relative to the exterior row of roller bearings; the number and diameter of the interior row of roller bearings less than the number and diameter of exterior row of roller bearings,
   e. an eccentric stepping gear with exterior and interior stepping gears having different diameters with differing numbers of gear teeth structured to accommodate roller bearings joined off-center on top of one another and eccentrically attached at a selected throw to the eccentric input drive shaft to position the exterior and interior eccentric stepping gears within the cylindrical interior of the gear ring so that the exterior stepping gear teeth contact and push against the exterior row of roller bearings in a stepping motion causing the joined interior stepping gear teeth to push against and move the interior row of ball bearings in a stepping motion to rotate the output gear at a reduced output gear ratio, and
   f. encasement structure with portals to accommodate the eccentric input drive shaft and output drive shaft leading into an interior structured to position and operably secure within the interior the eccentric stepping gear, the gear ring, and output gear operably associated with the eccentric drive shaft and output drive shaft to effectuate gear reduction.

2. An eccentric dual stepping gear roller bearing system according to claim 1, wherein the output gear rotates either in the same or in the opposite direction of the drive shaft depending upon whether the interior stepping gear contacts the interior or exterior surfaces of the interior row of roller bearings 3. An eccentric dual stepping gear roller bearing system according to claim 1, wherein the roller bearings are ball bearings.

4. An eccentric dual stepping gear roller bearing system according to claim 1, wherein the number of roller bearings in the exterior row are two more than the number of roller bearings in the interior row.

5. An eccentric dual stepping gear roller bearing system according to claim 1, wherein the size of the circular diameter of the interior row of roller bearings and the exterior row of roller bearings differs and is selected to provide the desired gear reduction.

6. An eccentric dual stepping gear roller bearing system according to claim 1, wherein the size of the diameters of the roller bearings in the interior row and the diameters of the roller bearings in the exterior row is selected to provide the desired gear reduction.

7. An eccentric dual stepping gear roller bearing system according to claim 1, wherein the throw of the eccentric stepping gears is selected so that the stepping gears cusps contact approximately one-third of the roller bearings at a given time.

8. An eccentric dual stepping gear roller bearing system according to claim 1, wherein the gear reduction is in excess of 10:1.

9. An eccentric dual stepping gear roller bearing system according to claim 1, wherein the drive inputs to the eccentric input drive shaft and output drive shaft are reversed to provide an increased output gear ratio.

* * * * *